United States Patent [19]
Bilandzic et al.

[11] Patent Number: 6,059,244
[45] Date of Patent: May 9, 2000

[54] CONVERTIBLE CONTAINER HOLDING ASSEMBLY

[75] Inventors: Mirko Bilandzic, Etobicoke; John Kacsala, Alliston; Dusit Sukonthapanich, Newmarket, all of Canada

[73] Assignee: Collins & Aikman Plastics, Inc., Troy, Minn.

[21] Appl. No.: 09/034,558

[22] Filed: Mar. 3, 1998

[51] Int. Cl.⁷ ...................................................... A47K 1/09
[52] U.S. Cl. ........................ 248/311.2; 224/282; 224/926
[58] Field of Search ................. 248/311.2, 314, 248/315; 224/926, 282; 297/188.17, 188.16, 188.15, 188.19

[56] References Cited

U.S. PATENT DOCUMENTS

| | | | |
|---|---|---|---|
| 4,511,072 | 4/1985 | Owens | 224/273 |
| 5,052,728 | 10/1991 | Fukumoto | 292/106 |
| 5,060,899 | 10/1991 | Lorence et al. | 248/311.2 |
| 5,072,989 | 12/1991 | Spykerman et al. | 297/194 |
| 5,167,392 | 12/1992 | Henricksen | 248/311.2 |
| 5,190,259 | 3/1993 | Okazaki | 248/311.2 |
| 5,487,519 | 1/1996 | Grabowski | 248/311.2 |
| 5,524,958 | 6/1996 | Wieczorek et al. | 297/188.17 |
| 5,527,008 | 6/1996 | Schutter et al. | 248/311.2 |
| 5,598,999 | 2/1997 | Plocher et al. | 248/311.2 |
| 5,618,018 | 4/1997 | Baniak | 248/311.2 |
| 5,628,486 | 5/1997 | Rossman et al. | 248/311.2 |
| 5,673,890 | 10/1997 | Duesterberg | 248/311.2 |
| 5,692,658 | 12/1997 | Fischer et al. | 224/281 |
| 5,762,307 | 6/1998 | Patmore | 248/311.2 |
| 5,800,011 | 9/1998 | Spykerman | 297/188.19 |

*Primary Examiner*—Anita M. King
*Attorney, Agent, or Firm*—Bliss McGlynn, P.C.

[57] ABSTRACT

A convertible container holding assembly includes a housing fixedly secured to a structure such as an armrest or instrument panel. A base is movable into and out of the housing between retracted and extended positions. The base includes a support and a stabilizing edge. The support and stabilizing edge define a portion of a cupholding area. A stabilizing arm is pivotally secured to the base and is positionable in an infinite number of positions such that it is capable of positively abutting the container when the container is positively abutting the stabilizing edge, regardless of the diameter of the container. A brake prevents the stabilizing arm from moving to its outermost position once it is forced into engagement with the container. The stabilizing arm may be reset by forcing it to its innermost position or by retracting the base into the housing and moving the base back to its extended position.

20 Claims, 4 Drawing Sheets

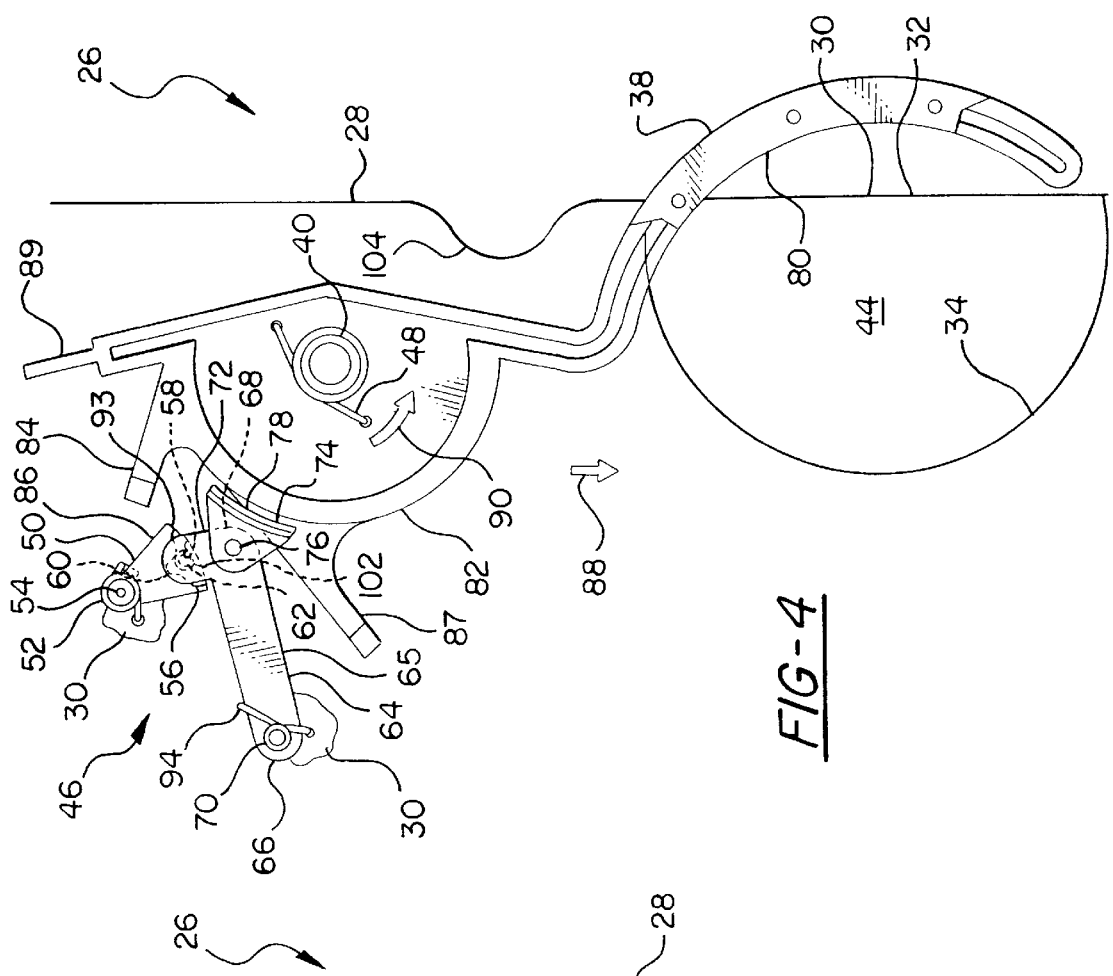
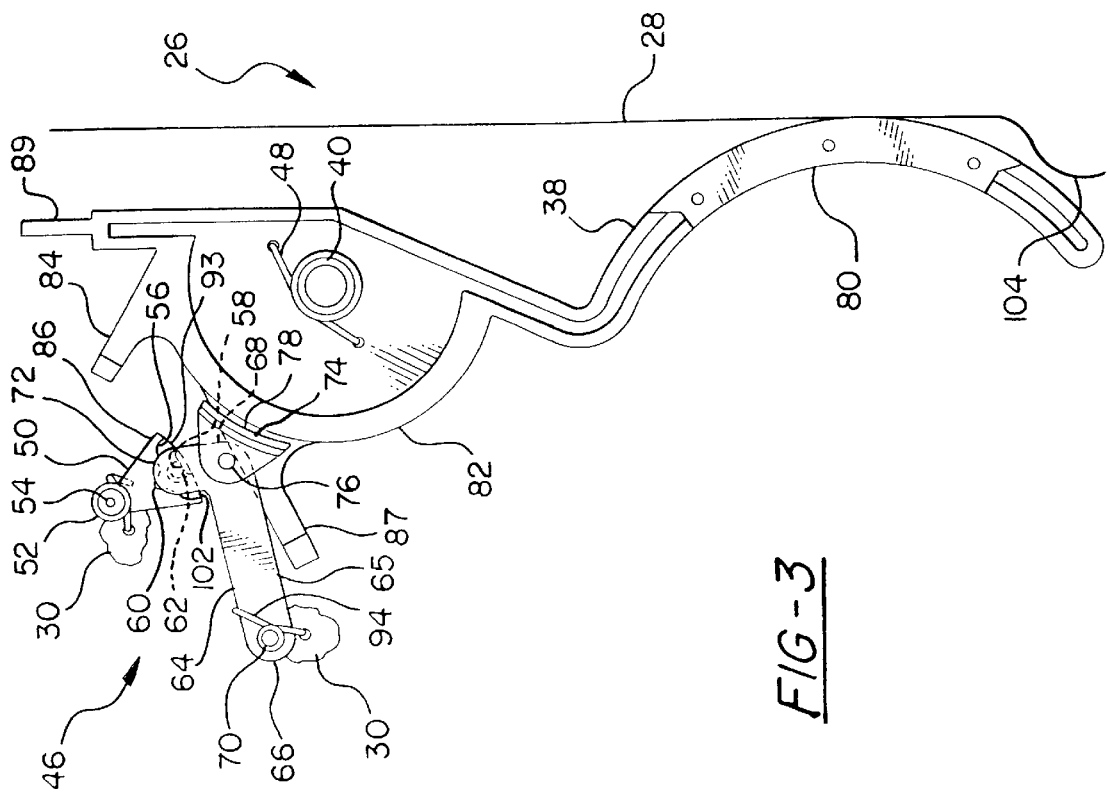

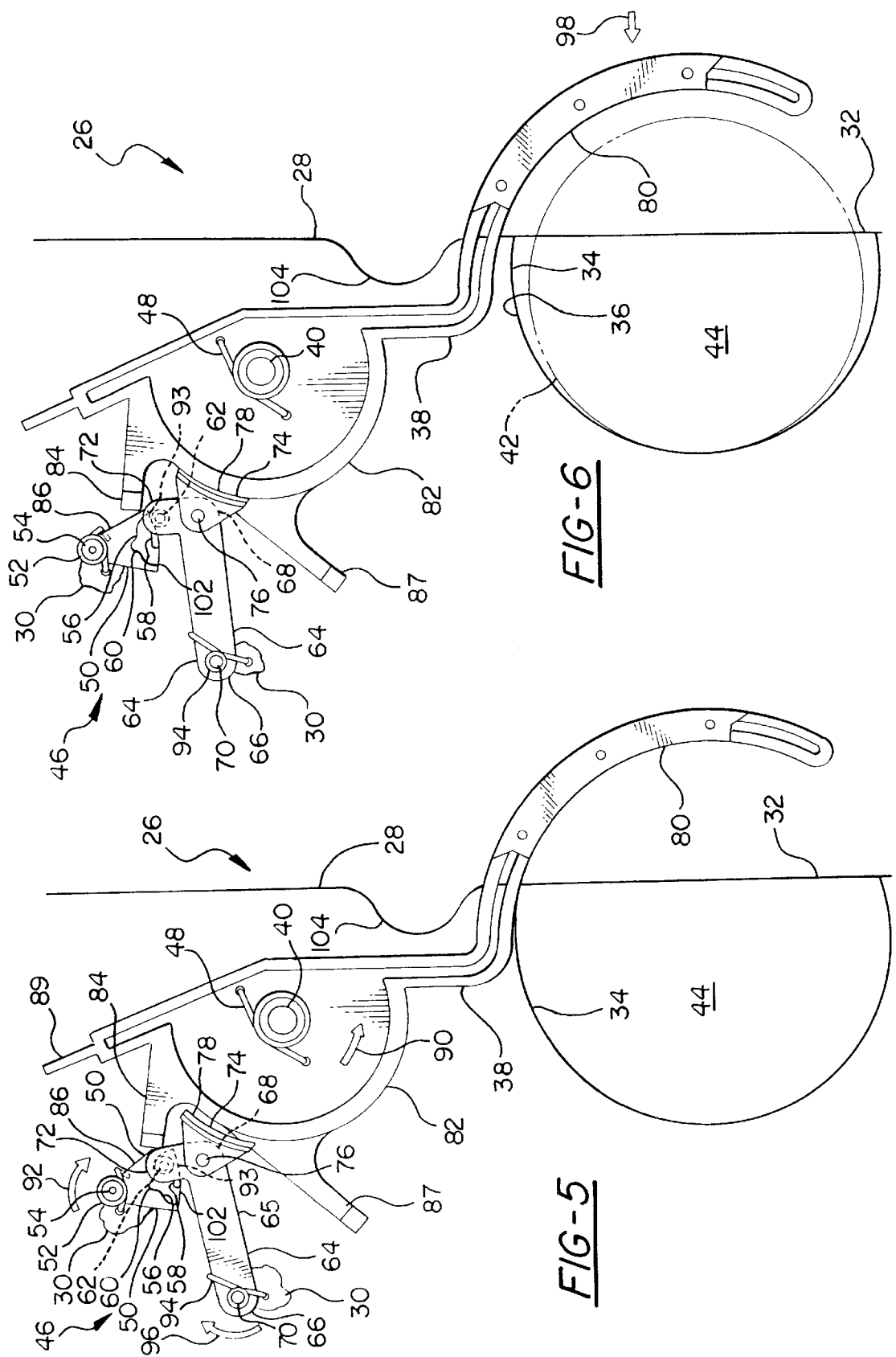

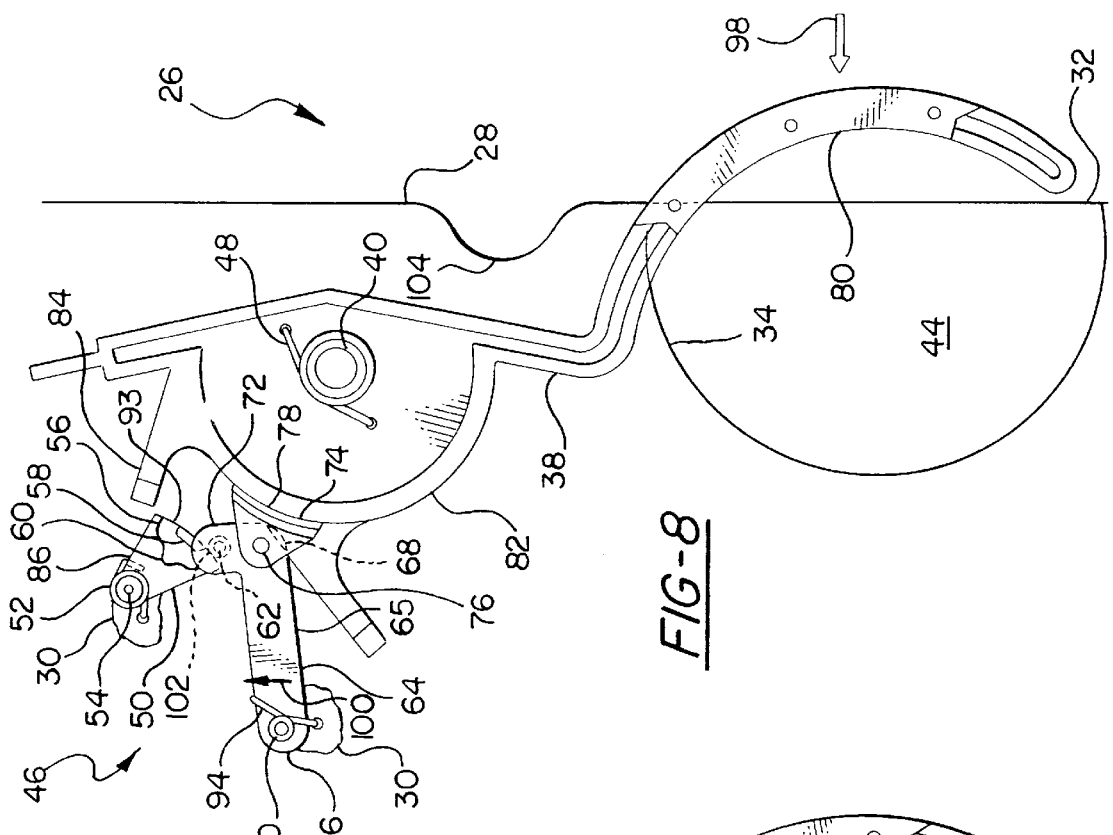
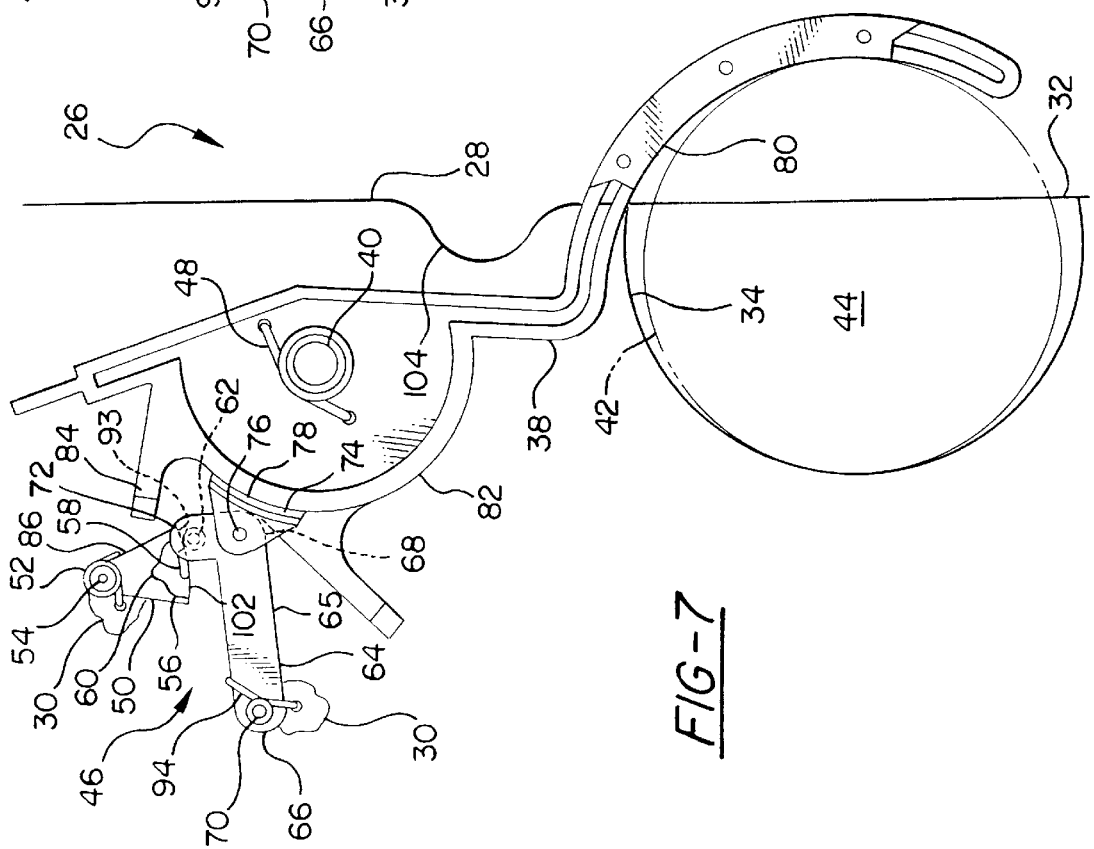

CONVERTIBLE CONTAINER HOLDING ASSEMBLY

BACKGROUND OF THE INVENTION

1. Field of the Invention

The invention relates to a convertible container holding assembly. More specifically, the invention relates to a convertible container holding assembly capable of holding containers of varying sizes.

2. Description of the Related Art

Convertible container holding assemblies found in motor vehicles are commonly referred to as cupholders. Demands have been placed on cupholder design to minimize the motion of the cup being held to reduce the potential and magnitude of spills. One factor relating to spills is the relative motion between the cup and the cupholder. One way to reduce this relative motion is to stabilize the cup within the cupholder.

One attempt to stabilize the cup within the cupholder is disclosed in U.S. Pat. No. 5,527,008, issued to Schutter, et al., on Jun. 18, 1996. This patent discloses a convertible container holding assembly including a retractable base which extends between a retracted position and an extended position. Two arm portions pivot to an outermost position when the base is moved to the extended position. A pawl and ratchet are associated with each of the arm portions. If the cup being held has a smaller diameter than the diameter created by the arm portions in the outermost position and the base, the arm portions may be moved inwardly toward the base where they are locked in position by the pawls securing against specific detents in the ratchets. Although this cupholder acknowledges the need for positioning the arm portions with respect to the cup being held thereby, the discreet positions of the arm portions are a direct function of the number of detents on the ratchet. Therefore, the arm portions cannot be positioned exactly where needed to ensure a secure fit between the cupholder and the cup being held.

Similarly, U.S. Pat. No. 5,167,392, issued to Henricksen on Dec. 1, 1992, discloses a convertible container holding assembly having two arms which are pivotal about a base portion. The arms include three detents to position the arm in three different positions depending on the size of the cup being held. Again, this patent shows an appreciation for the need for varying the position of the arms. All cups cannot be properly held, however, using the three arbitrary positions in which the arms may be placed due to the three detents provided.

SUMMARY OF THE INVENTION

A convertible container holding assembly is disclosed having a housing fixedly secured to a structure. The assembly includes a base which is movable between a retracted position within the housing and an extended position out of the housing. The base includes a support and a stabilizing edge for supporting a container. The assembly includes a stabilizing arm which is pivotally secured to the base and is used to stabilize the container. The stabilizing arm is positionable in an infinite number of positions such that the stabilizing arm abuts the container when the container abuts the support edge.

One advantage associated with the invention is the ability to hold and stabilize a container within a motor vehicle. Another advantage associated with the invention is the ability to hold and stabilize a container within a motor vehicle while reducing the relative motion between the holding assembly and the container. Still another advantage associated with the invention is the ability to stabilize a container being held in a motor vehicle by positively engaging a majority of the periphery of the container regardless of the dimension thereof.

BRIEF DESCRIPTION OF THE DRAWINGS

Other advantages of the invention will be readily appreciated as the same becomes better understood by reference to the following detailed description when considered in connection with the accompanying drawings, wherein:

FIG. 3 is a top view, partially cut away, of one embodiment of the invention in the retracted position;

FIG. 4 is a top view, partially cut away, of one embodiment of the invention with the stabilizing arm moving toward the extended position;

FIG. 5 is a top view, partially cut away, of one embodiment of the invention with the stabilizing arm moving to the extended most position and the brake moving from a disengaging position to engaged position;

FIG. 6 is a top view, partially cut away, of one embodiment of the invention with the stabilizing arm extended most position;

FIG. 7 is a top view, partially cut away, of one embodiment of the invention holding a container; and FIG. 8 is a top view, partially cut away, of one embodiment of the invention with the stabilizing arm being moved to the retracted position.

DETAILED DESCRIPTION OF THE PREFERRED EMBODIMENT(S)

Figure 1:
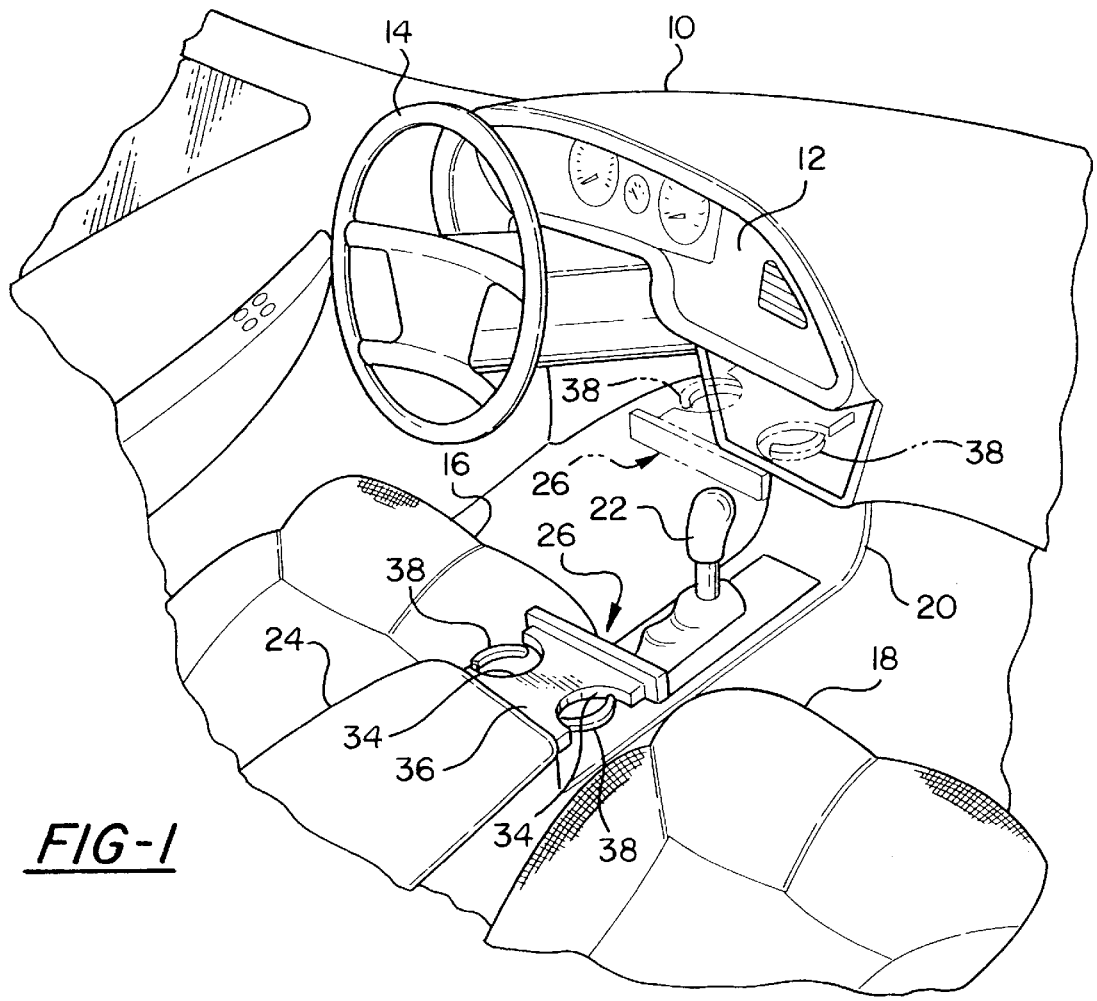
FIG. 1 is a perspective view, partially cut away, of a passenger compartment of a motor vehicle incorporating one embodiment of the invention.
Figure 2:
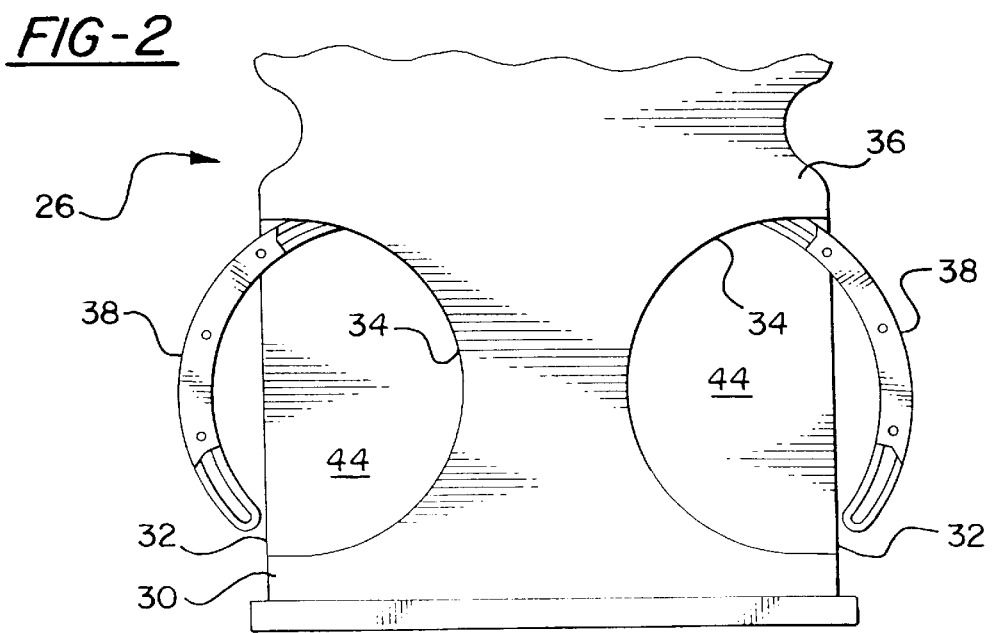
FIG. 2 is a top view, partially cut away, of one embodiment of the invention.

Referring to FIG. 1, a passenger compartment of a motor vehicle 10 is shown partially cut away. The passenger compartment includes an instrument panel 12, steering wheel 14, driver seat 16, passenger seat 18 and a transmission console 20, including a shift lever 22, extending between the driver seat 16 and the passenger seat 18. The transmission console 20 includes an armrest section 24. The invention, a convertible container holding assembly, is generally indicated at 26. As shown in FIG. 1, the convertible container holding assembly 26 (hereinafter the cupholder 26) is shown in an extended position as it extends out of the armrest section 24 of the transmission console 20 toward the instrument panel 12. As an alternative location, the cupholder 26 is shown in phantom in the extended position as it extends out of the instrument panel 12. It may be appreciated by those skilled in the art that the cupholder 26 may be housed in any structure which is convenient for usage and storage in the passenger compartment, including a back seat section (not shown), if any.

Referring to FIGS. 2 through 8, a housing, graphically represented by line 28 in FIGS. 3 through 8, is secured to a structure, the armrest section 24 in the embodiment shown in FIG. 1. A base 30 is movable between a retracted position within the housing 28 and an extended position substantially out of the housing 28. The extended position is shown in FIG. 1. The base 30 includes a support 32 and a stabilizing edge 34 located above the support 32. In the embodiment shown in the Figures, the support 32 is a base plate which may extend under the entire cupholding assembly 26. The stabilizing edge 34 is a portion of a circle defined within a top plate 36 of the base 30. In the embodiment shown, there are two stabilizing edges 34 and a single support 32. It may be appreciated by those skilled in the art that the support 32 may be fabricated from a plurality of parts. It may be further appreciated that a single stabilizing edge 34 defining a single cupholder space may also be used without adding to the invention.

A stabilizing arm 38 is pivotally secured to the base 30 with a pivot pin 40. The stabilizing arm 38 stabilizes a container 42, shown in phantom in FIGS. 6 and 7, by defining a cupholding space 44. The cupholding space 44 is defined as the space between the stabilizing arm 38 and the stabilizing edge 34 extending over the support 32. The stabilizing arm 38 is positionable in an infinite number of positions such that the stabilizing arm 38 abuts the container 42 when the container 42 abuts the stabilizing edge 34. It may be appreciated by those skilled in the art that soft resilient pieces may be attached to the stabilizing edge 34.

A brake is generally shown at 46 in FIGS. 3 through 8. The brake 46 prevents the stabilizing arm 38 from moving to its outermost position. The stabilizing arm 38 is biased to its outermost position by a spring 48. More specifically, the brake 46 stops the stabilizing arm 38 in any one of the infinite number of positions even though the spring 48 biases the stabilizing arm 38 to its outermost position.

The brake 46 includes a latch 50 which prevents the brake 46 from engaging the stabilizing arm 38. The latch 50 is spring biased with a second spring 52 to pivot about a pivot pin 54. The latch 50 includes a channel 56 having a recess 58 and a relief 60. The recess 58 receives a channel pin 62, discussed subsequently, and holds the channel pin 62 in place. The relief 60 provides a space within the channel 56 for the channel pin 62 to move therein when the brake 46 is being released.

The brake 46 includes a pivot arm 64 which includes a side surface 65 and extends between a base end 66 and a distal end 68. The base end 66 is pivotal about a pivot pin 70. A latch arm 72 extends out from the distal end 68 of the pivot arm 64. In the embodiment shown in the Figures, the latch arm 72 extends out from the pivot arm 64 perpendicularly thereto. The channel pin 62 is fixedly secured to the latch arm 72. Therefore, the latch arm 72 and the pivot arm 64 move along the contours of the channel 56 when the channel pin 62 is in the channel 56. There is no lost motion between the latch arm 72 and the pivot arm 64.

A friction pad 74 is pivotally secured to the distal end 68 of the pivot arm 64 by a pivot pin 76. The friction pad 74 pivots freely with respect to the distal end 68. The friction pad 74 defines an arcuate surface. Said another way, the surface 78 of the friction pad 74 is not planar.

The stabilizing arm 38 includes a cup receiving end 80 having a radius of curvature similar to that of a cup or container 42 which may be received within the cupholding space 44 of the cupholder 26. The stabilizing arm 38 also includes a brake receiving surface 82 used for receiving the surface 78 of the friction pad 74. The brake receiving surface 82 may have a surface treatment to enhance the coefficient of friction thereof. The brake receiving surface 82 has a contour similar to that of the surface 78. The similarities in the curvatures of the surfaces 78, 82 allow a maximum amount of contact of the surfaces 78, 82 to maximize the braking capability of the brake 46. The arcuate curvatures of the surfaces 78,82 allow for complete engagement therebetween regardless of the orientation of the stabilizing arm 38, thus allowing an infinite number of positions.

The stabilizing arm 38 further includes a release arm 84 which releases the latch 50 to allow the brake 46 to engage the stabilizing arm 38. In the embodiment shown in the Figures, the release arm 84 extends out from the brake receiving surface 82 tangentially thereto. The release arm 84 engages a side surface 86 of the latch 50 pivoting the latch 50 about its pivot pin 54.

The stabilizing arm 38 further includes a disengagement arm 87 extending out from the brake receiving surface 82 tangentially thereto. The disengagement arm 87, when engaging the side surface 65 of the pivot arm 64, disengages the brake 46 from the stabilizing arm 38 by forcing the pivot arm 64 up so that the channel pin 62 engages with the latch 50 which holds the pivot arm 64 in position for the preparation of the stabilizing arm 38 to return to its extended position.

With specific reference to the sequence of FIGS. 3 through 8, the operation of the cupholder 26 will now be discussed. FIG. 3 shows the cupholder 26 in its retracted position. The friction pad 74 is not engaging the brake receiving surface 82. Therefore, the stabilizing arm 38 abuts the housing 28. Upon moving the base 30 in a direction as represented by arrow 88 in FIG. 4, the stabilizing arm 38 is permitted to pivot in a counterclockwise direction as represented by arrow 90. The stabilizing arm 38 pivots outwardly because the stabilizing arm 38 is being moved, by moving the base 30, outside of the housing 28. The stabilizing arm 38 is allowed to pivot because the friction pad 74 still has not engaged the brake receiving surface 82 of the stabilizing arm 38.

Turning to FIG. 5, the stabilizing arm 38 has moved in the direction of arrow 90 such that the release arm 84 engages the side surface 86 of the latch 50. This engagement forces the latch 50 to rotate in a clockwise direction as represented by arrow 92. Once the latch 50 has been rotated to the position shown in FIG. 5, the channel pin 62 has moved to a position within the channel 56 such that it may be released from the channel 56 by moving through an outlet 93. A spring 94, wrapped around the pivot pin 70 of the pivot arm 64, forces the pivot arm 64 into a clockwise rotation as represented by arrow 96. This moves the channel pin 62 out of the channel 56 as is shown in FIG. 6.

By allowing the channel pin 62 to be removed from the channel 56, the friction pad 74 is able to engage the brake receiving surface 82 of the stabilizing arm 38. The stabilizing arm 38 will remain in that position until a force, represented by arrow 98, is applied to the stabilizing arm 38. Once applied, the force 98 is capable of overcoming the friction generated by the friction pad 74 and the stabilizing arm 38 may be moved to a retracted position to engage the container 42.

As may be seen in FIG. 7, the stabilizing arm 38 has been moved to engage the container 42. The stabilizing arm 38 will remain in that position even if the container 42 is removed because the friction pad 74 continues to engage the brake receiving surface 82 of the stabilizing arm 38 preventing the movement thereof.

To disengage or reset the stabilizing arm 38, it is moved to its innermost position allowing the channel pin 62 to enter the channel 56 and be received by the recess 58. A second way to reset the stabilizing arm 38 is discussed subsequently.

With reference to FIG. 8, a force 98 being applied to the stabilizing arm 38 moves the stabilizing arm 38 into an innermost position allowing the base 30 to be retracted inside the housing 28. By moving the stabilizing arm 38 inwardly, the release arm 84 rotates away from the latch 50.

The latch 50 is then rotated in a counterclockwise direction by the second spring 52. The disengagement arm 87 forces the pivot arm 64 to rotate in a counterclockwise direction as is represented by arrow 100. The channel pin 62 moves up to the latch 50 until it is again received by the channel 56 at an inlet 102 of the channel 56. Continued rotation of the stabilizing arm 38 forces the channel pin 62 into the channel 56 to be received thereby. As the base 30 is moved back into the housing 28, the stabilizing arm 38 passes over a protrusion 104 which forces the stabilizing arm 38 to rotate in a clockwise direction to a greater extent forcing the channel pin 62 into the channel 56 sufficiently such that the channel pin 62 is then received by the recess 58. Once the channel pin 62 is received by the recess 58, and the stabilizing arm 38 passes over the protrusion 104, the friction pad 74 no longer engages the brake receiving surface 82 of the stabilizing arm 38 allowing the stabilizing arm 38 to freely rotate to its outer most position once the base 30 is moved to the extended position outside the housing 28 to again hold a container 42.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

We claim:

1. A convertible holding assembly comprising:
   a housing fixedly secured to a structure;
   a base movable between a retracted position within said housing and an extended position out of said housing, said base including a support for supporting a container and a stabilizing edge for stabilizing the container;
   a stabilizing arm pivotally secured to said base for stabilizing the container against said stabilizing edge, said stabilizing arm positionable in an infinite number of positions such that said stabilizing arm abuts the container when the container abuts said stabilizing edge; and
   a brake for stopping said stabilizing arm in any one of said infinite number of positions.

2. A convertible container holding assembly as set forth in claim 1 wherein said stabilizing arm includes a brake receiving surface having an arcuate surface.

3. A convertible container holding assembly as set forth in claim 2 wherein said brake includes a latch to prevent said brake from engaging said stabilizing arm.

4. A convertible container holding assembly as set forth in claim 3 wherein said brake includes a pivot arm extending between a base end pivotally secured to said base and a distal end.

5. A convertible container holding assembly as set forth in claim 4 wherein said brake includes a friction pad pivotally secured to said pivot arm.

6. A convertible container holding assembly as set forth in claim 5 wherein said pivot arm includes a latch arm extending out from said distal end.

7. A convertible container holding assembly as set forth in claim 6 wherein said latch includes a channel allowing said latch arm to move therethrough.

8. A convertible container holding assembly as set forth in claim 7 including a release arm for releasing said latch to engage said brake with said stabilizing arm.

9. A convertible container holding assembly as set forth in claim 8 wherein said release arm is fixedly secured to said stabilizing arm.

10. A convertible container holding assembly as set forth in claim 9 wherein said latch arm includes a channel pin.

11. A convertible container holding assembly as set forth in claim 10 wherein said stabilizing arm includes a disengagement arm.

12. A convertible holding assembly comprising:
    a housing fixedly secured to a structure;
    a base movable between a retracted position within said housing and an extended position out of said housing, said base including a support for supporting a container and a stabilizing edge for stabilizing the container;
    a stabilizing arm pivotally secured to said base for stabilizing the container against said stabilizing edge, said stabilizing arm positionable in an infinite number of positions such that said stabilizing arm abuts the container when the container abuts said support edge;
    a brake for stopping said stabilizing arm in any one of said infinite number of positions, said brake including a pivot arm extending between a base end pivotally secured to said base and a distal end and a friction pad pivotally secured to said pivot arm.

13. A convertible container holding assembly as set forth in claim 12 wherein said brake includes a latch to prevent said brake from engaging said stabilizing arm.

14. A convertible container holding assembly as set forth in claim 13 wherein said pivot arm includes a latch arm extending out from said distal end.

15. A convertible container holding assembly as set forth in claim 14 wherein said latch includes a channel allowing said latch arm to move therethrough.

16. A convertible container holding assembly as set forth in claim 15 wherein said latch arm includes a channel pin.

17. A convertible container holding assembly as set forth in claim 16 wherein said channel includes a recess to receive and hold said channel pin from passing through all of said channel.

18. A convertible container holding assembly as set forth in claim 17 wherein said channel further includes a relief to allow said channel pin to move out of said recess when said latch is pivoted.

19. A convertible container holding assembly as set forth in claim 18 wherein said latch arm extends from said pivot arm perpendicularly thereto.

20. A convertible container holding assembly as set forth in claim 12 wherein said stabilizing arm includes a brake receiving surface having an arcuate surface.

* * * * *

UNITED STATES PATENT AND TRADEMARK OFFICE
CERTIFICATE OF CORRECTION

PATENT NO. : 6,059,244
DATED : May 9, 2000
INVENTOR(S) : Mirko Bilandzic et al.

It is certified that error appears in the above-identified patent and that said Letters Patent is hereby corrected as shown below:

ON THE TITLE PAGE:
Item
[73] under Assignee, "Minn." should be --Mich.--.

Column 2, line 27, after "to" please insert --an--.

Column 2, line 29, after "arm" please insert --in the--.

Signed and Sealed this

Twenty-seventh Day of March, 2001

Attest:

NICHOLAS P. GODICI

Attesting Officer

Acting Director of the United States Patent and Trademark Office